Figure 1:
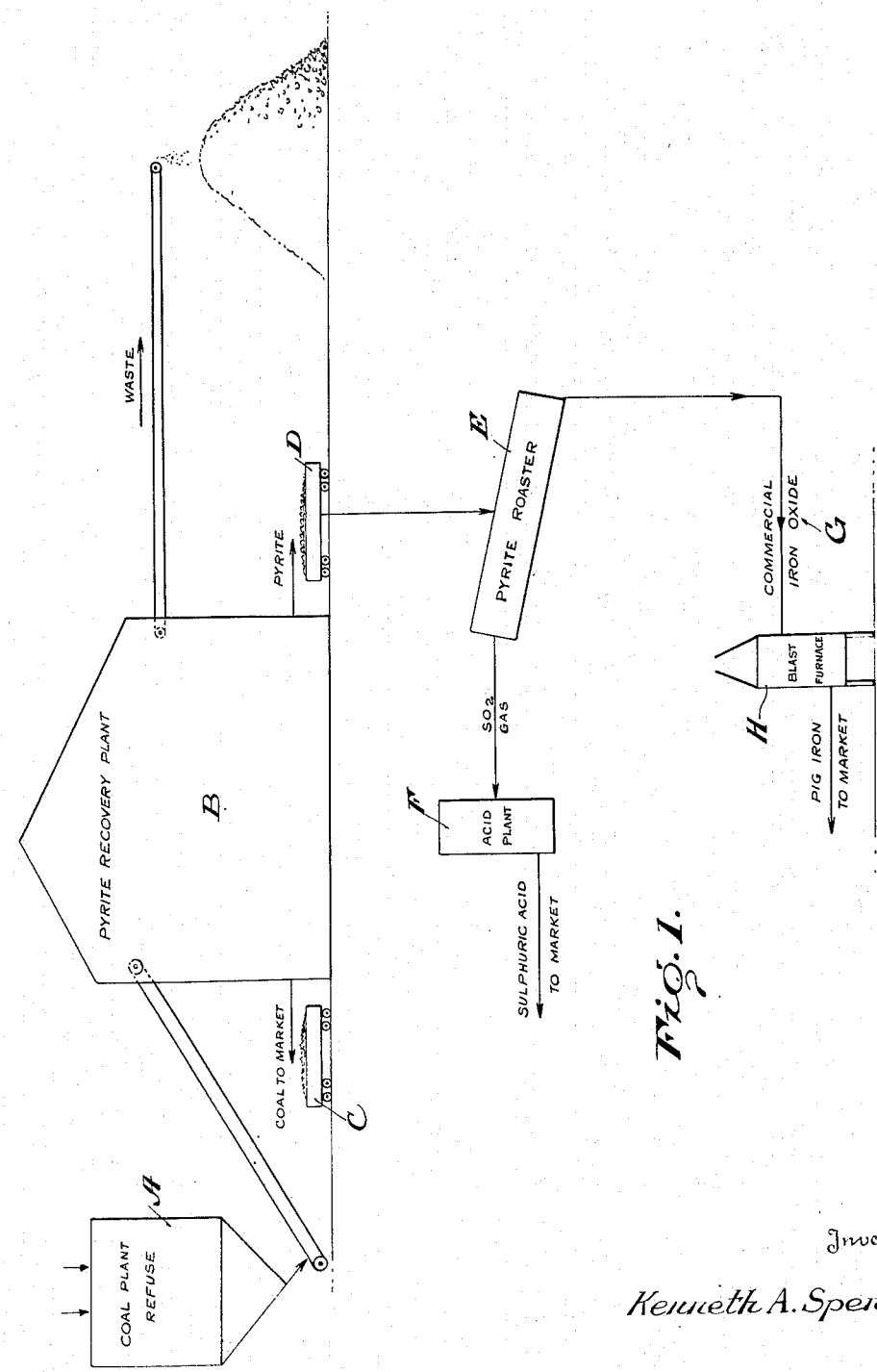

Dec. 3, 1940.  K. A. SPENCER  2,223,468
PROCESS AND APPARATUS FOR TREATING PYRITE-CONTAINING MATERIALS
Filed Dec. 13, 1937  3 Sheets-Sheet 3

Inventor:
Kenneth A. Spencer

Patented Dec. 3, 1940

2,223,468

UNITED STATES PATENT OFFICE 2,223,468

PROCESS AND APPARATUS FOR TREATING PYRITE-CONTAINING MATERIALS

Kenneth A. Spencer, Pittsburg, Kans.

Application December 13, 1937, Serial No. 179,397

5 Claims. (Cl. 209—2)

This invention relates to a process and to a novel arrangement of apparatus for treating pyrite-containing materials, particularly coal mine refuse, with the object of recovering good marketable coal and high grade pyrite suitable for numerous industrial purposes, for example, as will be presently pointed out, for the production of high grade sulphuric acid and iron oxide.

The utility and advantages of the new process will be appreciated when it is considered that enormous quantities of coal mine refuse go annually to waste for want of commercially practicable and profitable means for separating its valuable contents from the slate, stone, clay and other impurities. Efforts made in the past to recover coal or pyrite, or both, from such refuse have failed because of prohibitive operation costs and because the quality of the final products was inferior to the quality of the products available from normal sources.

The new process and combination of apparatus for practicing it in all its phases as disclosed herein is believed to constitute the first commercially successful solution of the problem stated above. This is especially important with respect to the recovery of pyrite, the yield and quality of which are such that the product can successfully compete with other sources of supply for many industrial purposes, for example, for use in the manufacture of glass, and particularly as a source of sulphur.

The various features and objects of the invention are realized by subjecting the refuse in a continuous process to a series of successive crushing and sizing operations and selectively treating the material thus obtained to eliminate successively the impurities and recover the valuable contents. In the course of these operations the refuse is first crushed to a predetermined size, and marketable coal is recovered therefrom, while impurities of little or no commercial value are eliminated. The remaining material is then again subjected to a series of sizing, crushing and grinding operations and, intermediate of these steps, to concentrating operations for separating the valuable pyrite from the progressively comminuted feed. Impurities are likewise progressively eliminated incident to each step in the process. The pyrite thus recovered may be directly supplied to the market. However, in one form of practicing the invention, the pyrite is fed to a suitable roaster for the production of high grade sulphuric acid. The iron oxide remaining after roasting may be put to numerous uses; e. g., it may be used as a paint pigment or it may be converted into pig iron.

Figure 2:
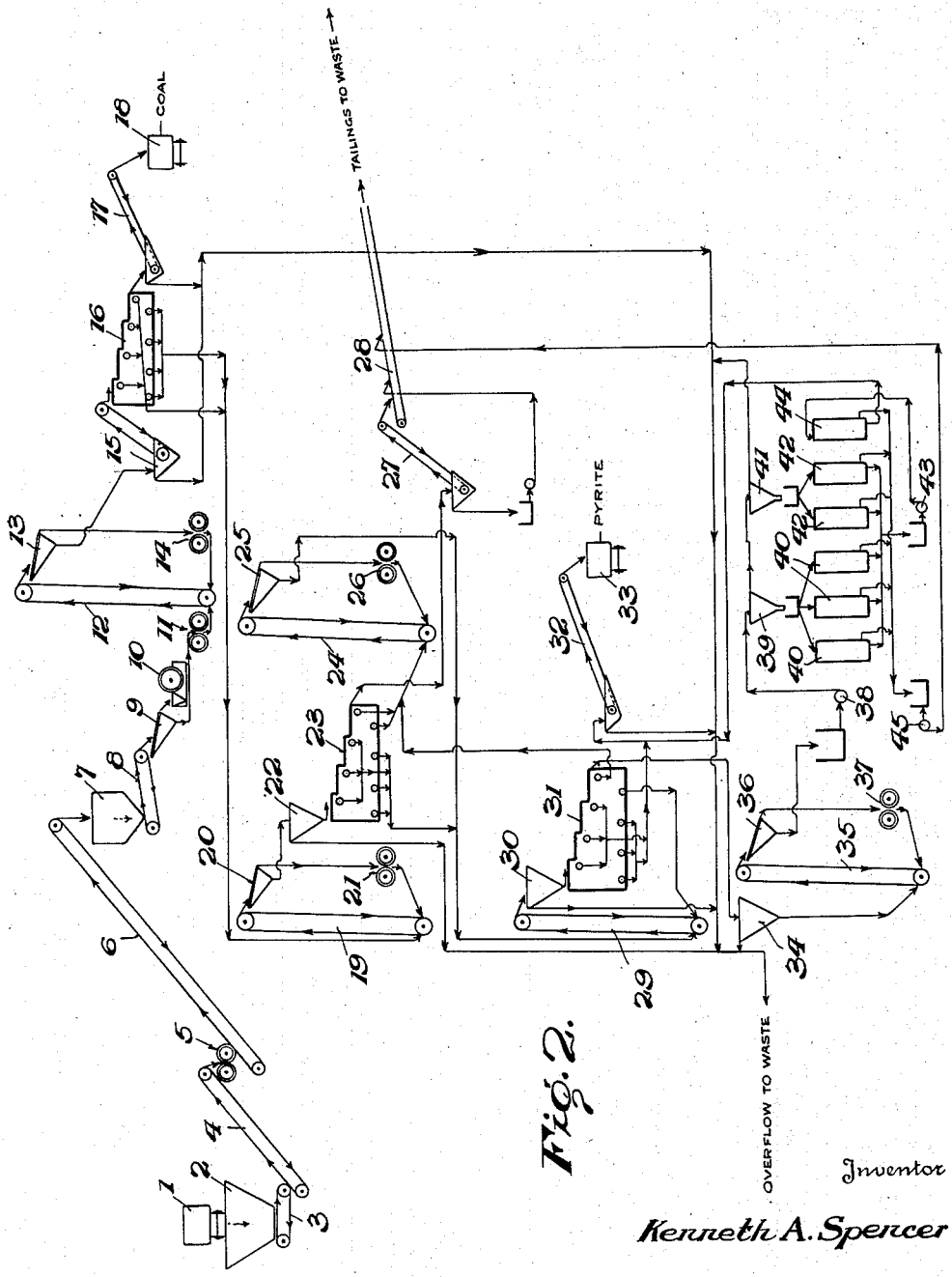
Figure 3:
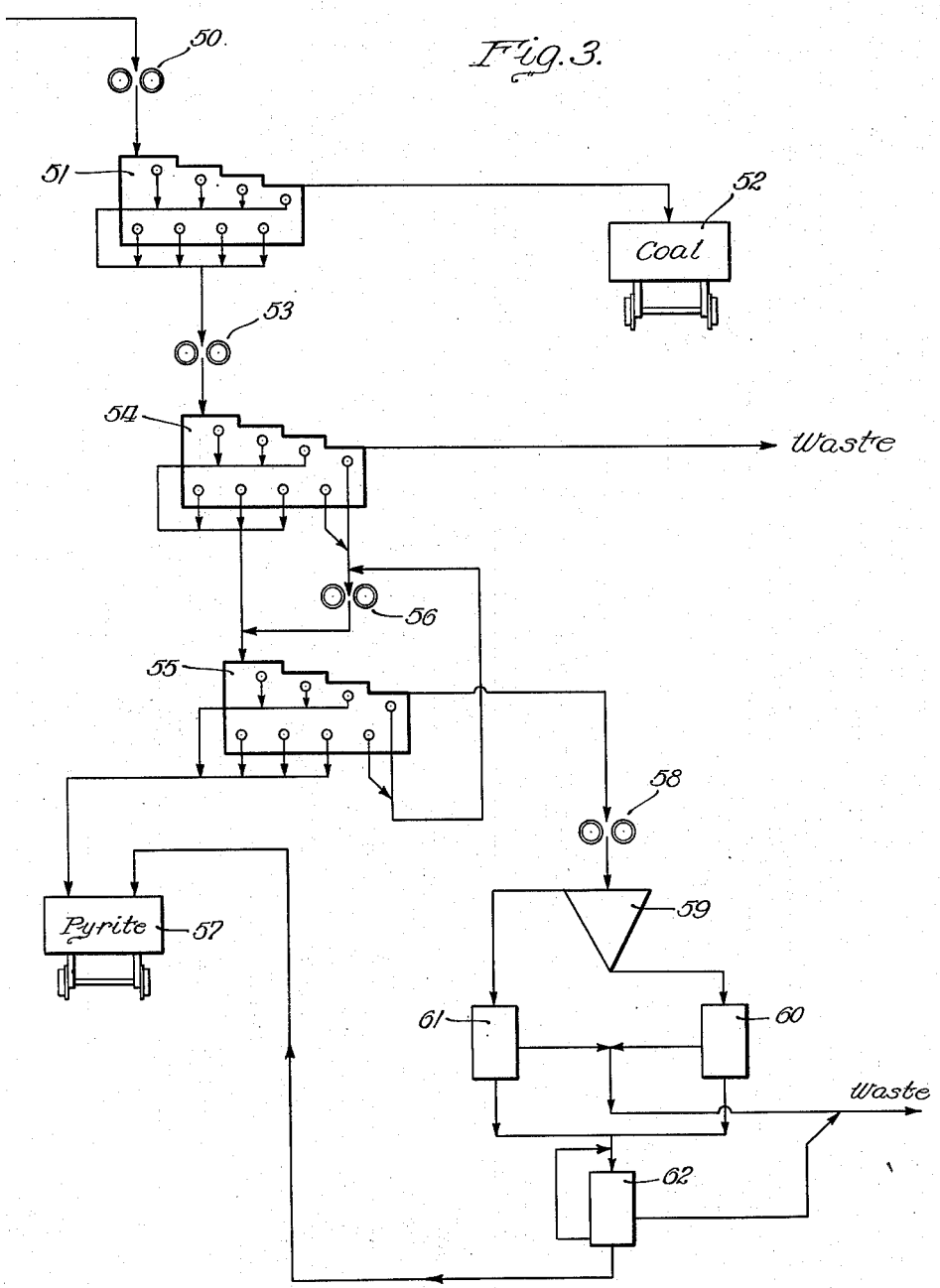

The invention will now be described in detail with reference to the accompanying drawings, wherein Fig. 1 is a diagrammatic flow sheet illustrating the general principles involved, showing the recovery of coal and pyrite from coal mine refuse, treatment of the pyrite for producing sulphuric acid and iron oxide, and the conversion of the latter into pig iron;

Fig. 2 represents a more detailed diagrammatic flow sheet showing one embodiment of the combination of apparatus that may be used for separating the coal and the pyrite from the mine refuse; and Fig. 3 is another flow sheet illustrating a simplified arrangement of apparatus for treating the raw material so as to recover the coal and the pyrite therefrom.

Referring now to Fig. 1, reference character A indicates a hopper or the like for receiving the coal mine refuse for treatment, and B is a pyrite recovery plant which will be more fully explained later on. This plant recovers coal C ready for the market and high grade pyrite D of approximately 80%–85% purity. This pyrite may be commercially disposed of, or it may be delivered in part or entirely to the pyrite roaster E, wherein the sulphur content is converted into $SO_2$ gas which is conducted to the acid plant F for the production of sulphuric acid. $SO_2$ gas is driven off from the pyrite in the roaster E, leaving iron oxide G. In the embodiment shown in Fig. 1, the iron oxide is converted into pig iron through the operation of the blast furnace H. The iron recovered after roasting the pyrite may, of course, be differently used; for example, I have used it successfully as a paint pigment and as a heavy muddying material in rotary oil drilling.

The blast furnace H, pyrite roaster E, and the acid plant F may be of any suitable known structure. It may be mentioned, however, that the purity of the pyrite recovered in the plant B is, as previously noted, so high and of such a quality that no difficulties are experienced in the roaster E due, for example, to fusing of the material on the hearths at high temperatures, which is frequently observed in roasting pyritic ores. The iron oxide G is likewise of good quality believed to be suitable for use in the ordinary blast furnace H and is expected to yield pig iron of a quality superior to that obtained from ordinary iron ore.

The coal and pyrite recovery plant B contains, as shown in the embodiment Fig. 2, a series of primary crushers for successively breaking up the raw feed to a predetermined size, for example, about ¾" to 1¼", and auxiliary devices for preparing the material for the separation of coal in suitable jigs or concentrators with means for eliminating impurities, and dewatering apparatus, as well as conveyor means, for removing the recovered coal. The machinery that may be used in carrying out this first phase of the process, and likewise the successive phases relating to the recovery of pyrite and the removal of impurities from the material remaining after coal is recovered from the initial feed, is well known. Specific types of devices for performing certain operations will be mentioned presently, wherever preference for one type of machine over another may be considered.

The material from which the coal has been extracted is subjected to further treatment in a continuous process including the use of secondary crushing or grinding means where the material is reduced to a size of about ⅜" to 2½" mesh, whereupon it is treated in suitable jigs or concentrators for recovering a rough pyrite concentrate ready for the market as a source of sulphur. Impurities are again separated and eliminated during this second phase of the process.

The third phase conforms in principle to the first and second phases. That is, the material remaining after recovery of the rough pyrite concentrate and containing small particles of pyrite intermixed with impurities, is subjected to a further treatment where it is again sized to about ⅛" and fed to a suitable final concentrator and classifier device, comprising, for example, hydraulic classifying cones and coarse, as well as fine, sand concentrating tables or the like. The impurities are thus removed from the fine pretreated feed, and the pyrite contents are extracted and recovered for the purpose stated before.

One embodiment of the recovery plant B (Fig. 1) will now be described in detail with reference to Fig. 2.

Coal mine refuse of large, small and medium sizes is delivered, for example, from a railroad car 1 to a suitable hopper 2. From this hopper it is withdrawn by an apron feeder 3 which is preferably driven at a variable speed so as to permit regulation of the tonnage feed to the pan conveyor 4. This conveyor discharges to a single roll coal-breaker 5 by which the material is crushed to a size of approximately 3½"–4". From the crusher 5 the material is delivered to the belt conveyor 6 which transports the product to a storage bin 7, preferably located at the concentrating plant proper. The product is withdrawn from the storage bin 7 by an apron feeder 8 which discharges onto a scalping screen 9 of approximately 2-inch mesh. The oversize of the screen 9 passes to the jaw crusher 10 set to reduce the particles to approximately 1½" in size. The undersize of the screen 9 joins the undersize of the jaw crusher 10, feeding to a spaced breaker roll 11 which is set to crush the material to approximately 1" in size. The material passing this crushing roll 11 is taken by the elevator 12 and delivered to a finishing screen 13 of approximately ¾-inch mesh. The oversize from this screen passes to the spaced crusher rolls 14 from which they are again delivered by the elevator to the screen 13, and all of the undersize of the screen 13 passes to a dewatering elevator 15, the overflow of which passes to waste, while the dewatered product is elevated and delivered to coal jigs or concentrators 16 comprising a series of cells shown in the drawings as four in number.

Any known and suitable jig or concentrator may be used for this purpose. It may be mentioned, however, that satisfactory results were obtained by the use of round bottom steel jigs similar to those used in the concentration of ore, but with separate cells and continuous mechanical bed draw. As an example of the general type of such jigs, reference is made to the "Reading jig" noted on page 694, "Handbook of Ore Dressing," by A. F. Taggart, published by John Wiley & Sons, Inc., New York, 1927. It should be understood, however, that other types of jigs or concentrators may be used to equal advantage, such as are described, for example, in the "Textbook of Ore Dressing," by R. H. Richards, published by McGraw-Hill Book Co., New York, in the section on "Coal Dressing," pages 623 ff. If jigs of the piston type are used in practicing this process, it is clear, of course, that the pulsating strokes per minute are to be adjusted in accordance with the size of the product to be separated. Reference to these well known jigs is made herein in order to state the type of machinery successfully used for this step of the process. However, this reference is not intended to indicate any undue limitation, because entirely different types of concentrators may be employed in place of the ones shown.

The tailings from the jigs 16 consist of finished coal which passes to a dewatering drag 17 by which it is delivered either to storage or directly to railroad cars 18, the overflow also passing to waste, as indicated in Fig. 2. This completes the first phase of the process; the next phase being concerned with the recovery of pyrite and incident elimination of impurities.

The hutch products and the bed draws from the coal jigs 16 constitute the pretreated raw material which is now treated for the recovery of pyrite. If desired or indicated by the nature of the raw material, the hutch product may be passed to waste. In the present example both products pass to an elevator 19 by which they are delivered to a screen 20. This screen is of approximately ⅜-inch mesh. The particular screen to be used at this stage will, of course, depend on the pretreatment which the raw feed has received prior to reaching this point in the process. We have used in one embodiment a screen jacket or screen 20, of 2½ mesh instead of ⅜". The oversize of this screen is ground by spaced grinding rolls 21 and is again passed to the elevator 19 for recirculation over the screen 20. The undersize of the screen 20 is passed to a dewatering cone 22, the overflow of which goes to waste, and the underflow of which is fed to the pyrite recovery jigs 23. These jigs or jig may again be of the general type described in connection with jig 16, having four compartments, however, set for operation in accordance with the size of material to be treated; suitable concentrators may take their place if desired. The jigs 23 furnish three products: first, tailings which pass to waste by way of the dewatering elevator 27 and discharge belt 28, the overflow being also passed to waste by way of a suitable pump or the like, as indicated; second, bed draws and hutch products from the first three cells, which are conveyed to the dewatering cone 30 by way of elevator 29; and third, the bed draw and hutch from the last cell, which consists normally of middlings requiring additional grinding to disassociate any coal that may be adhering to the pyrite. This middlings product is passed to the elevator 24 and delivered to the screen 25. The oversize of this screen is reground by spaced rolls 26 and returned to the elevator 24 for re-delivery to the screen 25, and the undersize joins the product from the first three cells of the concentrator or jigs 23 and passes to elevator 29 for delivery to the automatic dewatering cone 30, the overflow of which passes to waste and the underflow of which passes to a series of pyrite cleaning and finishing jigs or concentrators 31, a four-compartment jig being used. These latter jigs or concentrators may again be similar to the previously mentioned jigs or concentrators 16 and 23, respectively. They furnish, first, a finished pyrite concentrate from the first three cells, which passes to the dewatering drag 32 and is delivered to any desired place of storage or directly to railroad cars 33 (completing the second phase of the process); second, middling products from the bed draw of the fourth cell, which may be of a somewhat coarse character and require regrinding, for which reason it is passed to elevator 24, screen 25, and the spaced grinding rolls 26, for recirculation through the dewatering cone 30 and jigs 31; and third, a tailing product which is conveyed to the dewatering cone 34 and then subjected to the final treatment, constituting the third principal phase of the process.

The overflow from the cone 34 passes to waste, as shown, and the underflow is delivered by suitable means, for example, the elevator 35, to a sand screen 36, the undersize of which is of a size suitable for tabling, namely, about $\frac{1}{16}''-\frac{1}{8}''$. The oversize of the screen 36 is passed to the spaced grinding rolls 37 by which the particles are reground and again passed by way of the elevator 35 to the screen 36, and the undersize passes to the sump of the sand pump 38 by which it is delivered to a hydraulic classifying cone 39. The spigot product of this cone is split by means of a suitable distributor and conducted to coarse sand-concentrating tables 40, and the overflow is passed to a second hydraulic classifying cone 41, the spigot product of which is split by means of a distributor and delivered to fine sand-concentrating tables 42. The overflow from cone 41 is passed to waste.

The tables 40 and 42 furnish two products: first, a pyrite concentrate which passes to the sump of pump 43 and is conducted to the cleaner table 44 from which the finished fine concentrate is delivered to any suitable place of disposal, for example, to the car 33 by way of dewatering drag 32; second, a tailing which is passed to the sump of the tailing disposal pump 45 by which it is passed to waste. The tailings from table 44 are also passed to waste by means of the pump 45.

The disposal of fine finished pyrite concentrate from cleaner table 44 jointly with the disposal of the product from the concentrator 31 has been shown only for the sake of convenience. The disposal from these sources may be separate if desired.

Another arrangement of apparatus for treating the raw material in the plant B (Fig. 1) so as to obtain coal and pyrite is shown in Fig. 3, wherein the feed is delivered to a primary crusher 50 operating with spaced rolls as shown which reduces it to a size of approximately $3\frac{1}{2}''-4''$. The product from this crusher passes to suitable four-compartment jigs or concentrators 51 which may be of the same general class as the corresponding concentrators shown in Fig. 2 and serve the purpose of separating the coal substantially in the same way as already described. The tailings from these concentrators 51, which is coal, may be passed directly to the railroad car 52, and the hutch and bed draw products may either be separated, the hutch passing to waste, or both may be delivered to secondary crushing means 53, having spaced rolls, where the size of the particles is reduced to approximately $\frac{3}{8}''-\frac{1}{2}''$. The secondary crusher 53 prepares the feed for treatment in the pyrite rougher jigs or concentrators 54 equipped with four compartments and being of the same general class as the jigs 51. The tailings from these jigs pass to waste, and the hutch and bed draw products which constitute a rough pyrite concentrate are delivered to the four-compartment pyrite cleaner and finishing jigs 55. The hutch and bed draws from the last two cells constitute middlings that may require additional grinding and treatment to remove coal and other impurities adhering to the pyrite. These middlings are therefore conducted to the middling crusher 56 which has spaced rolls like the previously noted grinders or crushers from which they pass to the four-compartment cleaner or finishing jigs or concentrator 55 joining the rough concentrate delivered by the concentrators 54. The hutch and bed draws from the first three cells of the concentrator 55 constitute clean pyrite concentrate which is delivered to storage or disposal, for example, to the railroad car 57. The hutch and bed draws from the last cell may require additional grinding and crushing, and are therefore re-circulated over the middling crusher 56. The tailings of this concentrator are passed to a final grinder and crusher 58 which also has spaced rolls and reduces the particle size to approximately $\frac{1}{8}''$ delivering the treated product to a classifier 59. The underflow of this classifier passes to coarse sand tables 60, and the overflow to fine sand tables 61. The product delivered by both of these concentrating tables is conducted to the cleaner table or tables 62, the middlings of which are re-circulated, as indicated, and the tailings of which join the tailings from the concentrating tables 60 and 61 and pass jointly to waste. The product of the cleaner tables 62 constitutes again clean pyrite concentrate which may be delivered to the railroad car 57, or may be otherwise disposed of as desired.

By progressively crushing the ore as described, that is, by the stage grinding with spaced rolls, as shown in the drawings, the amount of extremely fine or powdered coal produced is small, and lump coal is produced which is about $\frac{3}{4}''-1\frac{1}{4}''$ in size. A large amount of impurities is progressively eliminated by the passage of overflow during the various steps in the process, for example, in Fig. 2 at 22, 30, 34, 39 and 41, and in Fig. 3 at 54, 60, 61 and 62. With respect of Fig. 3, it may be mentioned that additional primary crushers may precede the crusher 50, if desired or indicated by the type of raw feed to be treated, and impurities may be eliminated before the material passes to the primary crusher 50 and also at the concentrator 51. By grinding the product after it passes the coal concentrator 16 or 51, respectively, it is brought into the finely divided condition necessary for proper treatment in gravity separating apparatus such as the rougher jigs 23 and 31 (Fig. 2), or the corresponding jigs or concentrators 54 and 55 (Fig. 3). The pyrite-containing material passing, for example, from the cleaner jigs 31 (Fig. 2) or 55 (Fig. 3) is conserved, concentrated and purified in the tables 40, 42 and 44 (Fig. 2) or the corresponding tables 60, 61 and 62 (Fig. 3).

The process is not strictly limited to the exact sizes to which the raw material is reduced through and at the various crushing or sizing steps. The figures given herein with reference to the sizes of the material at the various steps correspond to actual working conditions; the sizes may be varied within wide limits, as already indicated in the foregoing description, depending in part on the type of raw feed that is to be subjected to treatment. In general, a range of 15% to 25% variation from the sizes as indicated will suffice in each instance for most conditions. The process has been described as taking place in three distinct phases of operation, namely, recovery of coal, recovery of bulk pyrite, and recovery of fine pyrite concentrate. This has been done chiefly for the purpose of convenient description and for facilitating the understanding, since any other arbitrary division of the process may be adopted for descriptive purposes.

Changes may be made within the scope and spirit of the appended claims, wherein I have defined what is considered new and desired to have protected by Letters Patent.

I claim:

1. In a plant for treating coal mine refuse to recover therefrom marketable coal and pyrite, a plurality of spaced roll grinding means for successively reducing said material to a predetermined particle size, a screen for separating the product of said grinding means, spaced grinding rolls, one of said plurality of roll grinding means, for grinding the oversize from said screen, a four-compartment jig for treating the screened product to separate marketable coal therefrom and to furnish a rough concentrate of pyrite mixed with impurities in the form of hutch and bed draws, a second screen for screening said concentrate, spaced grinding rolls for grinding the oversize from said second screen, a second four-compartment jig for subjecting the product of said second screen to a rough pyrite recovery operation, a third screen for separating the product from one of the compartments of said second jig, spaced grinding rolls for regrinding the oversize from said third screen to remove carbon and impurities from the particles thereof, said re-ground particles being recirculated over said third screen, a third four-compartment jig for receiving the products from the remaining compartments of said second jig jointly with the undersize from said third screen to subject the particles to a pyrite cleaning and finishing treatment, and means for removing finished pyrite from the compartments of said last noted jig.

2. In a plant for treating coal mine refuse to recover therefrom marketable coal and pyrite, a plurality of spaced roll grinding means for successively reducing said material to a particle size of approximately ¾″ while avoiding production of dust and fines, a screen for separating the product of said grinding means, spaced grinding rolls, one of said plurality of roll grinding means, for grinding the oversize from said screen for recirculation thereover, a four-compartment jig for treating the screened product to separate marketable coal therefrom and to furnish a pretreated pyrite-containing product in the form of hutch and bed draws, a second screen of ⅜″ mesh for screening said pretreated pyrite-containing product, spaced grinding rolls for grinding the oversize from said second screen to remove carbon and other impurities therefrom and delivering the ground product for re-circulation to said second screen, a second four-compartment jig for subjecting the undersize of said second screen to a rough pyrite recovery operation, a third screen for separating the middlings from one of the compartments of said second jig, spaced grinding rolls for treating the oversize from said third screen to remove carbon and impurities from the particles thereof and delivering said particles for re-circulation to said third screen, a third four-compartment jig for receiving the hutch and bed draws from the remaining compartments of said second jig jointly with the undersize from said third screen to subject the particles to a cleaning and finishing operation, means for removing finished pyrite from certain compartments of said third jig, and means for re-circulating middlings from one compartment of said third jig over said third screen.

3. A plant for treating coal mine refuse to recover therefrom marketable coal and pyrite, comprising a plurality of spaced roll grinding means for successively reducing said material to a particle size of approximately ¾″ while avoiding production of dust and fines, a screen for separating the product of said grinding means, spaced grinding rolls, one of said plurality of roll grinding means, for grinding the oversize from said screen for recirculation thereover, a four-compartment jig for treating the screened product to separate marketable coal therefrom and to furnish a pretreated pyrite-containing product in the form of hutch and bed draws, a second screen of ⅜″ mesh for screening said pretreated pyrite-containing product, spaced grinding rolls for grinding the oversize from said second screen to remove carbon and other impurities therefrom and delivering the ground product for recirculation to said second screen, a second four-compartment jig for subjecting the undersize of said second screen to a rough pyrite recovery operation, a third screen for separating the middlings from one of the compartments of said second jig, spaced grinding rolls for treating the oversize from said third screen to remove carbon and impurities from the particles thereof and delivering said particles for recirculation to said third screen, a third four-compartment jig for receiving the hutch and bed draws from the remaining compartments of said second jig jointly with the undersize from said third screen to subject the particles to a cleaning and finishing operation, means for removing finished pyrite from certain compartments of said third jig, means for recirculating middlings from one compartment of said third jig over said third screen, a fourth screen and spaced grinding rolls associated therewith for regrinding the oversize therefrom, means for delivering the tailings from said third jig to said fourth screen, and concentrating means for treating the undersize product of said fourth screen to extract pyrite therefrom.

4. A plant for treating coal mine refuse to recover therefrom marketable coal and pyrite, comprising a plurality of spaced roll grinding means for successively reducing said material to a particle size of approximately ¾″ while avoiding production of dust and fines, a screen for separating the product of said grinding means, spaced grinding rolls, one of said plurality of roll grinding means, for grinding the oversize from said screen for recirculation thereover, a four-compartment jig for treating the screened product to separate marketable coal therefrom and to furnish a pretreated pyrite-containing product in the form of hutch and bed draws, a second screen of ⅜" mesh for screening said pretreated pyrite-containing product, spaced grinding rolls for grinding the oversize from said second screen to remove carbon and other impurities therefrom and delivering the ground product for recirculation to said second screen, a second four-compartment jig for subjecting the undersize of said second screen to a rough pyrite recovery operation, a third screen for separating the middlings from one of the compartments of said second jig, spaced grinding rolls for treating the oversize from said third screen to remove carbon and impurities from the particles thereof and delivering said particles for recirculation to said third screen, a third four-compartment jig for receiving the hutch and bed draws from the remaining compartments of said second jig jointly with the undersize from said third screen to subject the particles to a cleaning and finishing operation, means for removing finished pyrite from certain compartments of said third jig, means for recirculating middlings from one compartment of said third jig over said third screen, a fourth screen and spaced grinding rolls associated therewith for regrinding the oversize therefrom, means for delivering the tailings from said third jig to said fourth screen, classifying and concentrating means for receiving the undersize product from said fourth screen to extract pyrite therefrom, the particle size of said last noted product being about 1/16" to ⅛", and means associated with each of said jigs for successively removing from the material waste and impurities.

5. A plant for treating coal mine refuse to recover therefrom marketable coal and pyrite, comprising apparatus for pretreating the raw feed to recover the bulk of the coal therefrom and to deliver a pretreated concentrate containing pyrite and impurities, apparatus for subjecting said concentrate to a pyrite roughing treatment to free the pyrite particles of relatively coarse impurities, apparatus for receiving the product from said second apparatus to subject the same to a pyrite finishing operation and to deliver finished pyrite and comminuted particles containing pyrite, each of said apparatus containing a four-compartment jig and spaced roll grinding means, and apparatus for treating the comminuted particles to extract pyrite therefrom comprising spaced roll grinding means and classifying tables.

KENNETH A. SPENCER.